United States Patent Office 3,011,565
Patented Dec. 5, 1961

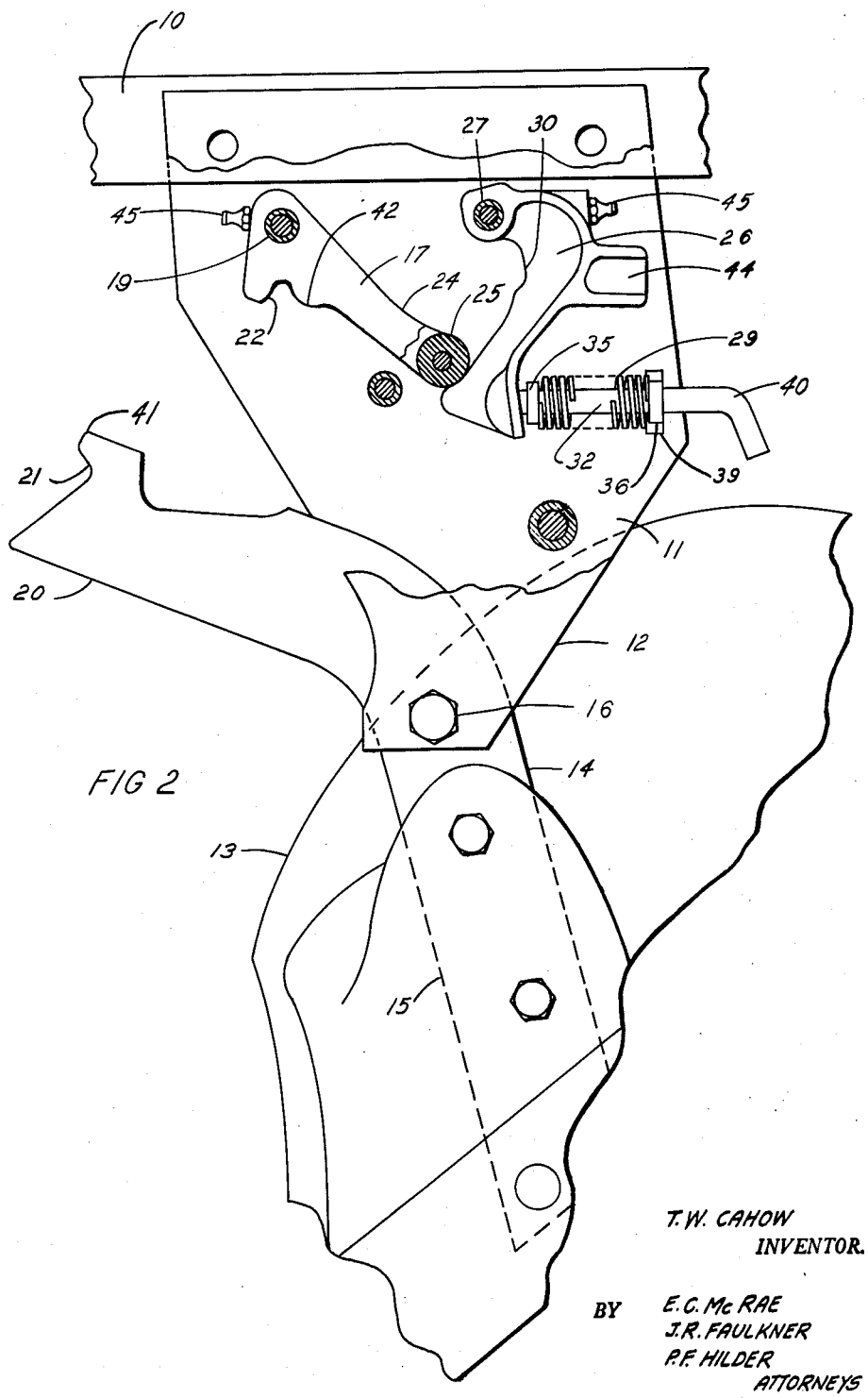

3,011,565
RELEASABLE PLOW STANDARD
Theodore W. Cahow, Birmingham, Mich., assignor to Ford Motor Company, Dearborn, Mich., a corporation of Delaware
Filed Nov. 4, 1957, Ser. No. 694,259
5 Claims. (Cl. 172—269)

This invention relates to plows and more particularly to overload protection for plows of the type which permits a plow standard to break back upon the plow striking a rock, stump or other obstruction that might otherwise cause bending of portions of the plow.

Moldboard plows customarily are provided with a horizontal, rearwardly extending plow beam from which a plow standard extends downward, the plow standard usually being downwardly forwardly inclined. The plow bottom, which comprises a landside, moldboard and share, supported on a frame, is secured to the lower end of the plow standard. Multibottom plows are usually provided with a beam for each bottom, the beams being laterally interconnected. When a plow bottom strikes an obstruction in the ground, e.g., a large rock or stump, the obstruction may altogether prevent further forward movement of the plow. In multibottom plows, upon one bottom being stopped by an obstruction, substantially the entire draft of the tractor is concentrated on that bottom, tending to bend or break various parts of the plow.

The present invention is directed to an improved plow construction in which, upon a plow bottom encountering an obstruction which stresses the plow standard with a greater than predetermined desirable force, the standard for that bottom will be released to pivot or break rearwardly, permitting the bottom to ride upwardly over the obstruction rather than bending or breaking the plow.

In the form shown, the present invention consists of a plow standard which is pivotally mounted on the plow beam and is provided with a release mechanism consisting of a locking lever for retaining the plow standard in normal position, the locking lever being biased towards releasing position by the force acting rearwardly against the plow standard as the plow is pulled through the ground. The locking lever is retained in normal position by a spring-pressed cam lever having a detent retaining the locking lever in normal position except when rearward force on the plow standard exceeds a predetermined value. The design and arrangement of the parts is such that the force required to displace the end of the locking lever from the detent on the cam lever has been greatly reduced in comparison to the force at the top of the plow standard. Also, the engagement between the top of the plow standard and the locking lever is essentially a rolling contact, and a roller is provided for engagement of the end of the locking lever with the cam lever, thus greatly reducing friction and providing a trip or release mechanism which is dependable in operation so as to protect the plow against overload but one which will not trip at less than predetermined load.

Among the objects of the present invention are to provide a simple and dependable plow standard release mechanism which will trip only upon the load on the plow standard exceeding a predetermined load, to provide such a structure which can be simply and economically produced, which is easy to adjust for different maximum loads and which is easily reset, and to generally improve release mechanisms of the type described.

Other objects and objects relating to details of manufacture and use will be more clear from the detailed description to follow.

My invention is clearly defined in the appended claims. In the claims, as well as in the description, parts may at times be identified by specific names for clarity and convenience, but such nomenclature is to be understood as having the broadest meaning consistent with the context and with the concept of my invention as distinguished from the pertinent prior art. The best form in which I have contemplated applying my invention is illustrated in the accompanying drawings forming part of this specification, in which:

FIG. 2 is a view similar to FIG. 1 of the mechanism after release of the plow standard.

Figures 1, 3:
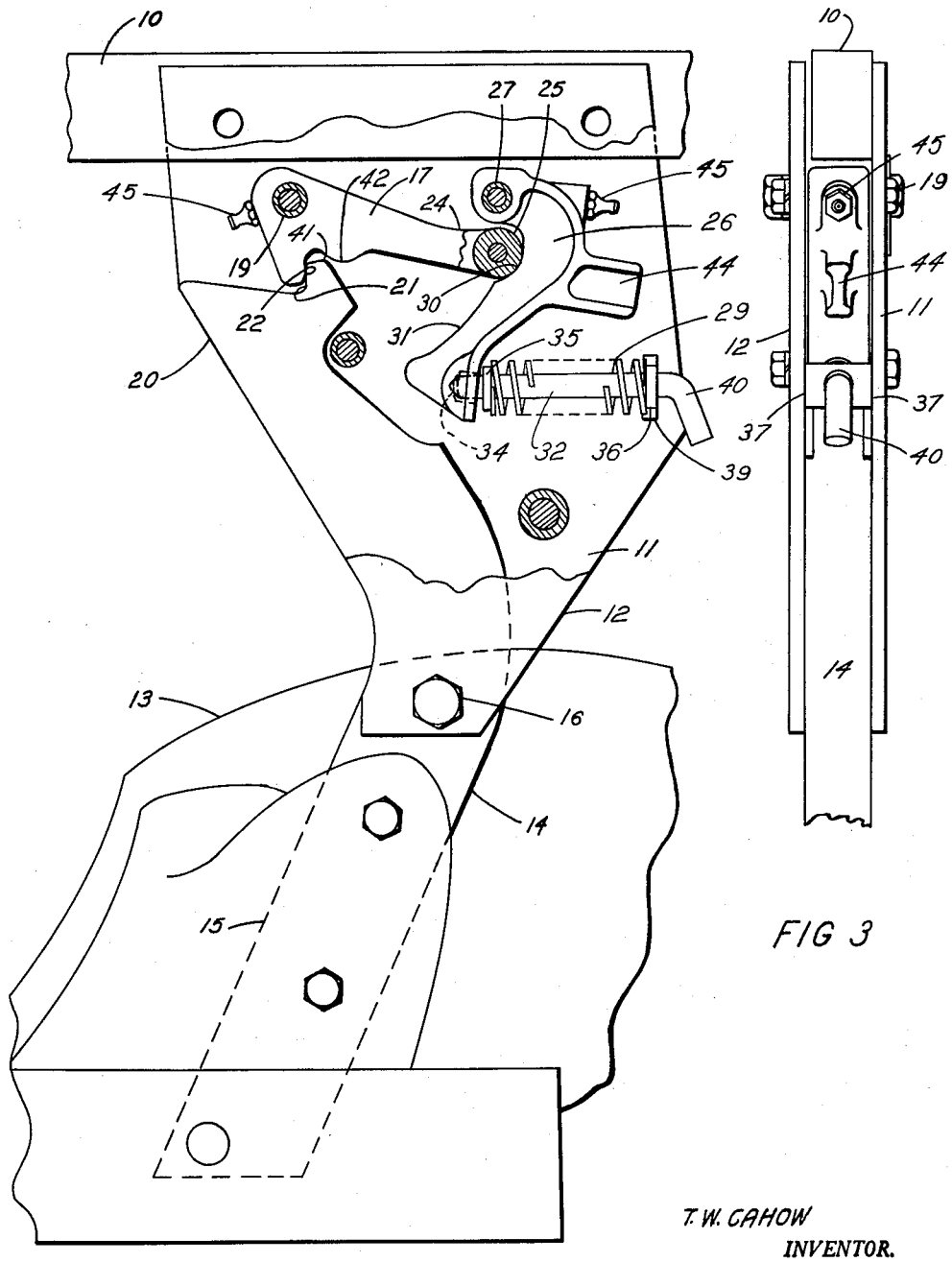
FIG. 1 is a somewhat diagrammatic side elevation of a plow, including a releasable plow standard mechanism, one side of the frame and portions of the plow being broken away.
FIG. 3 is a rear elevation of the mechanism shown in FIG. 1.

Referring now to FIG. 1, the device of the present invention is shown applied to a moldboard plow having a rearwardly extending plow beam 10, to the rear end of which a frame is affixed consisting of side frame members 11 and 12, which support a plow standard 14. The lower portion 15 of the plow standard 14 is downwardly forwardly inclined and supports a more or less conventional plow bottom 13 of the moldboard type. The present invention is concerned with the mechanism for releasing the plow standard 14 for pivoting on the side frame members 11 and 12 to permit the plow bottom 13 to ride over obstructions that would otherwise tend to bend or break the plow.

The plow standard 14 is pivotally mounted between the side frame members 11 and 12 by a pivot bolt 16 located adjacent to the lower ends of the side frame members and intermediate the length of the plow standard. Preferably, the plow standard 14 extends forwardly downwardly to the plow bottom 13, and extends forwardly upwardly towards the plow beam 10 from the pivot bolt 16, and lies in a vertical fore and aft plane which also extends through the plow beam 10.

The plow standard 14 is held in normal position against pivoting about the bolt 16 by a locking lever 17 which is pivotally mounted between the side frame members 11 and 12 by a pivot bolt 19 located a short distance above the upper end of the plow standard 14. The upper end portion 20 of the plow standard 14 is provided with a stepped contour, including a generally flat, vertical, transversely extending surface 21, which engages with a somewhat arcuate surface 22 on the locking lever 17 a short distance from the pivot bolt 19. When the locking lever 17 is in normal position, the surface 22 engages surface 21 of the plow standard to prevent forward oscillation of the upper portion 20 of the plow standard.

The inter-engagement of the plow standard 14 and locking lever 17 is such that there is essentially a line contact between the surfaces 21 and 22, which is located on and, during tripping a releasing of the plow standard, remains substantially on a line joining the pivot bolts 16 and 19 about which the plow standard and locking lever, respectively, are mounted for pivoting. As the plow bottom is pulled through the earth, the reaction of the earth on the plow bottom creates a moment about the pivot bolt 16 tending to rotate the plow standard counterclockwise as viewed in FIG. 1, tending also to rotate the locking lever 17 clockwise due to the inter-engagement of these two parts.

During tripping or releasing of the plow standard, there is substantially a rolling contact between the plow standard 14 and locking lever 17, and since the contact remains substantially on the line connecting the pivot bolts 16 and 19, the friction between these two parts is reduced, providing a more dependable release mechanism, as will be explained.

The end 24 of the locking lever 17 remote from the pivot bolt 19 is provided with a roller 25 mounted on a transverse axis and projecting beyond the end of the lever. The roller 25 is received by a cam lever 26 which is pivotally mounted between the side frame members 11 and 12 by a pivot bolt 27 adjacent its upper end. The cam lever 26 is biased against the roller 25 at all times by resilient means including a spring 29, as will be explained.

The cam lever 26 is provided with a cam track on its forward edge including a detent or depression a short distance below the pivot for receiving the roller 25 and holding the cam lever in normal position blocking forward oscillation of the plow standard 14. The remainder of the cam track on the cam lever 26 consists of a surface 31 which lies substantially along an arc of radius approximately equal to the length of the locking lever from the pivot bolt 19 to the cam-lever-engaging surface of the roller 25 and with a center adjacent the pivot bolt 19.

The cam lever 26 is biased against the roller 25 at all times by an assembly including a spring 29 and a rod 32 having its forward end received within a bore 34 formed on the rear side of the lower end of the cam lever 26. The rod 32 has a first spring retainer 35 adjacent its forward end and located between the side frame members 11 and 12 against which the forward end of the spring 29 bears. The first spring retainer 35 is threadedly engaged with a threaded portion of the rod 32 and the fit between the margins of the spring retainer and the side frame members 11 and 12 is such that the retainer can move forward or rearward with the rod, but cannot rotate.

A second spring retainer 36 is slidably received on the rod 32 and receives the rear end of the spring 29, the spring pressing against the retainer 36 to bias the rod forwardly against the cam lever 26. The opposite side edges 37, 37 of the spring retainer 36 extend through vertical slots 39, 39 formed in the side frame members 11 and 12 to support the spring 29, rod 32, and associated parts.

The degree of pressure exerted by the spring 29 against the cam lever 26 can be controlled by rotating the rod 32 to move the spring retainer 35 forward or rearward with respect to the rod and thus regulate the initial compression of the spring 29. The rearward end 40 of the rod 32 may be bent or inclined at an angle as indicated in the drawings to serve as a handle for rotating the rod, the portion 40 lying between the side frame members 11 and 12 and preventing accidental rotation of the rod when the parts of the release mechanism are in normal position.

When the mechanism previously described is in normal position for operation of the plow, soil pressure against the plow bottom is of insufficient magnitude of cause the locking lever 17 to move downwardly out of the depression or detent 30. However, upon the plow bottom striking an obstruction or the draft otherwise becoming excessive, oscillating force of the plow standard 14, transmitted to the locking lever 17 through the inter-engaging surfaces 21 and 22 becomes sufficient so that the roller 25 is forced downwardly along the cam lever 26 out of the depression or detent 30, oscillating the cam lever counterclockwise somewhat, forcing the rod 32 rearwardly and compressing the spring 29. After riding up out of the detent 30, the roller can move freely along the surface 31 of the cam lever to the position shown in FIG. 2 without substantial further compression of the spring 29, the locking lever then being rotated out of blocking engagement with the upper end of portion 20 of the plow standard 14 and permitting the plow standard to oscillate counterclockwise as viewed in the drawings to permit the plow bottom to ride up and over the obstruction.

To reset or restore the mechanism to original position, it is necessary only to reverse the tractor so as to push the plow beam rearwardly and oscillate the plow standard 14 clockwise. Engagement of the upper edge portion 41 of the plow standard 14 against zone 42 of the locking lever 17 will return the locking lever to normal position within the detent 30, permitting the cam lever 26 to return to its normal position.

When the mechanism is in tripped or released position (FIG. 2), the rod 32 is displaced rearwardly sufficiently to permit the bent portion 40 of the rod to clear the rear edges of frame members 11 and 12, permitting rotation of the rod for adjustment of initial compression of the spring 29 which, as described, determines the force required to release the bottom.

Also, the mechanism may be tripped by engaging an integral, rearwardly projecting arm 44 located at the rear edge of the cam lever 26 and rotating the cam lever counterclockwise to cause the locking lever 17 to rotate clockwise as in normal tripping of the mechanism. This may be accomplished easily when the plow bottom is lifted rather than resting on the ground, so that the plow bottom is free to swing rearwardly.

The pivot bearings of the locking lever 17 and cam lever 26 may be lubricated by grease fittings 45 located on those parts. Preferably, the roller 25 is provided with an oil-impregnated bronze bushing to assure lubrication and reduce friction.

In the above described mechanism, a force of several thousand pounds exerted at the lower end of the plow standard 14 is reduced to a downward force at the roller 25 of only about 1500 pounds, and a rearward force of the lower end of the cam lever 26 against the spring 29 of a considerably lesser magnitude. In this release mechanism, at locations where forces are of high magnitude, they are carried by pivots or inter-engaging parts of low frictional resistance to movement. The force has been so reduced at the point of engagement between the roller 25 and cam lever 26 that there is no tendency for the roll to brinell the surface of the cam lever, and dirt or minor imperfection of the surface will not prevent movement of the roller and tripping of the mechanism.

I claim:

1. In a plow of the moldboard type having a generally horizontal, rearwardly extending plow beam, a frame fixed to the plow beam, a plow standard extending downwardly from the frame, and a plow bottom mounted on the lower end of the plow standard; the improvement which comprises: the plow standard being journalled in the frame for pivotal movement on a horizontal axis to permit the upper end of the standard to swing forwardly upon the plow bottom engaging an obstruction, a locking lever pivotally mounted in the frame for oscillation in the plane of the plow standard and normally blocking forward movement of the plow standard, the pivotal mounting being located adjacent one end of the locking lever and close to the upper end of the plow standard when in unreleased position, forward biasing of the plow standard tending to rotate the locking lever out of blocking position, a cam lever having an end pivotally mounted in the frame adjacent the free end of the locking lever when in blocking position and having a cam surface extending along the lever from adjacent the pivotal mounting, the cam surface having a depressed portion at the end thereof adjacent the pivotal mounting for receiving the free end of the locking lever, and means adjacent the free end of the cam lever for biasing the cam lever against the locking lever, whereupon when forward biasing of the upper end of the plow standard exceeds a predetermined amount, the free end of the locking lever will rotate the cam lever against its bias to permit the locking lever to ride out of the depression in the cam lever and move along the cam surface to a position releasing the plow standard.

2. In a plow of the moldboard type having a generally horizontal, rearwardly extending plow beam, a frame fixed to the plow beam, a plow standard extending downwardly from the frame, and a plow bottom mounted on the lower end of the plow standard; the improvement which comprises: the plow standard being journalled in the frame for pivotal movement on a horizontal axis to permit the upper end of the standard to swing forwardly upon the plow bottom engaging an obstruction, a locking lever pivotally mounted in the frame adjacent the upper end of the plow standard for oscillation in the plane of the plow standard and having a portion normally engaged with and blocking forward swinging movement of the plow standard, the pivotal mounting of the locking lever being adjacent at end thereof and forward biasing of the upper end of the plow standard tending to rotate the locking lever out of blocking position, a cam lever journalled in the frame adjacent the other end of the locking lever when in blocking position for rotation in the general plane of the locking lever, and a spring biasing the cam lever against said other end of the locking lever, the cam lever having a cam surface for receiving said other end of the locking lever and a depression in said surface to retain the locking lever in blocking position but to release said locking lever for oscillation out of position blocking forward swinging of the plow standard by rotation of the cam lever against its bias upon forward biasing of the upper end of the plow standard exceeding a predetermined amount.

3. In a plow of the moldboard type having a generally horizontal, rearwardly extending plow beam, a frame fixed to the plow beam, a plow standard extending downwardly from the frame, and a plow bottom mounted on the lower end of the plow standard; the improvement which comprises: the plow standard being journalled in the frame for pivotal movement on a horizontal axis to permit the upper end of the standard to swing forwardly upon the plow bottom engaging an obstruction, a locking lever pivotally mounted in the frame adjacent the upper end of the plow standard for oscillation in the plane of the plow standard and having a portion normally engaged with and blocking forward swinging movement of the plow standard, the pivotal mounting of the locking lever being adjacent an end thereof and forward biasing of the upper end of the plow standard tending to rotate the locking lever out of blocking position, a cam lever having one end journalled in the frame adjacent the other end of the locking lever when in blocking position for rotation in the general plane of the locking lever, and a spring located adjacent the other end of the cam lever for biasing the cam lever against the other end of the locking lever, the cam lever having a cam surface for receiving said other end of the locking lever and a depression in said surface to retain the locking lever in blocking position but to release said locking lever for oscillation out of position blocking forward swinging of the plow standard by rotation of the cam lever against its bias upon forward biasing of the upper end of the plow standard exceeding a predetermined amount.

4. In a plow of the moldboard type having a generally horizontal, rearwardly extending plow beam, a frame fixed to the plow beam, a plow standard extending downwardly from the frame, and a plow bottom mounted on the lower end of the plow standard; the improvement which comprises: the plow standard being journalled in the frame for pivotal movement on a horizontal axis to permit the upper end of the standard to swing forwardly upon the plow bottom engaging an obstruction, a locking lever pivotally mounted in the frame adjacent the upper end of the plow standard for oscillation in the plane of the plow standard and having a portion normally engaged with and blocking forward swinging movement of the plow standard, the pivotal mounting of the locking lever being adjacent an end thereof and forward biasing of the upper end of the plow standard tending to rotate the locking lever out of blocking position, a cam lever having one end journalled in the frame adjacent the other end of the locking lever when in blocking position for rotation in the general plane of the locking lever, and a spring located adjacent the other end of the cam lever for biasing the cam lever against the other end of the locking lever, the cam lever having a depression in one side of the lever adjacent the journalled end to retain the locking lever in blocking position but to release said locking lever for oscillation out of position blocking forward swinging of the plow standard by rotation of the cam lever against its bias upon forward biasing of the plow standard exceeding a predetermined amount.

5. In a plow as claimed in claim 4, the cam lever having a cam surface extending generally along an arc having a radius corresponding with the radius of the arc generated by said other end of the locking lever.

References Cited in the file of this patent

UNITED STATES PATENTS

| | | |
|---|---|---|
| 387,751 | Swearingen | Aug. 14, 1888 |
| 1,808,477 | Printz | June 2, 1931 |
| 1,808,478 | Printz | June 2, 1931 |
| 2,756,659 | Lindeman | July 31, 1956 |

FOREIGN PATENTS

| | | |
|---|---|---|
| 102,518 | Sweden | Sept. 9, 1941 |

UNITED STATES PATENT OFFICE
CERTIFICATE OF CORRECTION

Patent No. 3,011,565                      December 5, 1961

Theodore W. Cahow

It is hereby certified that error appears in the above numbered patent requiring correction and that the said Letters Patent should read as corrected below.

Column 5, line 10, for "at" read -- an --.

Signed and sealed this 17th day of April 1962.

(SEAL)
Attest:

ESTON G. JOHNSON

Attesting Officer

DAVID L. LADD
Commissioner of Patents